US008578381B2

(12) United States Patent
Podila

(10) Patent No.: US 8,578,381 B2
(45) Date of Patent: Nov. 5, 2013

(54) APPARATUS, SYSTEM AND METHOD FOR RAPID RESOURCE SCHEDULING IN A COMPUTE FARM

(75) Inventor: Sharma R. Podila, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1541 days.

(21) Appl. No.: 11/925,437

(22) Filed: Oct. 26, 2007

(65) Prior Publication Data
US 2009/0113434 A1 Apr. 30, 2009

(51) Int. Cl.
G06F 9/46 (2006.01)

(52) U.S. Cl.
USPC ............ 718/102; 718/100; 718/103; 718/104; 718/105

(58) Field of Classification Search
USPC .......................... 718/100, 102, 103, 104, 105
See application file for complete search history.

(56) References Cited

U.S. PATENT DOCUMENTS

| | | | |
|---|---|---|---|
| 6,263,359 B1 * | 7/2001 | Fong et al. .................... 718/103 |
| 6,418,459 B1 * | 7/2002 | Gulick ......................... 718/104 |
| 7,509,671 B1 * | 3/2009 | Bedell et al. ..................... 726/6 |
| 7,984,447 B1 * | 7/2011 | Markov ....................... 718/103 |
| 2004/0015976 A1 * | 1/2004 | Lam ............................. 718/104 |
| 2004/0205108 A1 * | 10/2004 | Tanaka ......................... 709/201 |
| 2005/0283782 A1 * | 12/2005 | Lu et al. ........................ 718/100 |
| 2006/0080666 A1 * | 4/2006 | Benedetti et al. ............. 718/104 |
| 2008/0162242 A1 * | 7/2008 | Schneur et al. ................... 705/9 |

OTHER PUBLICATIONS

Krallmann et al., "On the Design and Evaluation of Job Scheduling Algorithms," Fifth Workshop on Job Scheduling Strategies for Parallel Processing, pp. 17-42, 1999.
Markov, Lev, "Two Stage Optimization of Job Scheduling and Assignment in Heterogeneous Compute Farms," Proceedings of the 10th IEEE International Workshop on Future Trends of Distributed Computing Systems, 6 pages, 2004.

* cited by examiner

*Primary Examiner* — Emerson Puente
*Assistant Examiner* — Willy W Huaracha
(74) *Attorney, Agent, or Firm* — Polsinelli PC

(57) ABSTRACT

Disclosed herein is a method for scheduling computing jobs for a compute farm. The method includes: receiving a plurality of computing jobs at a scheduler; assigning a signature to each computing job based on at least one computing resource requirement of the computing job; storing each computing job in a signature classification corresponding to the signature of the computing job; and scheduling at least one of the plurality of computing jobs for processing in the compute farm as a function of the signature classification.

23 Claims, 8 Drawing Sheets

APPARATUS, SYSTEM AND METHOD FOR RAPID RESOURCE SCHEDULING IN A COMPUTE FARM

FIELD OF THE INVENTION

The present invention relates to compute farms. More specifically, the present invention relates to workload scheduling in a compute farm.

BACKGROUND

Distributed computing over a heterogeneous collection of resources has garnered substantial interest from various industries including, for example, technical and scientific computing, financial, agriculture, and manufacturing. A core component in such an environment is a job scheduler, which schedules workload and assigns resources to the workload.

Large-scale compute farms include thousands of resources such as central processing units ("CPUs") and software licenses. Thousands of users submit tens or hundreds of thousands of individual jobs that need to be scheduled and run. This vast collection of individual jobs constitutes the workload of the compute farm.

In a highly utilized compute farm, it is common for the workload's demand for resources to be larger than available capacity. Scheduling several thousands of jobs according to specified service level agreements ("SLAs") and other policies, priorities and constraints is a problem that has been the subject of significant research. Various vendors and open source projects have developed products to address the scheduling problem.

As can be understood from FIG. 1, which is a diagrammatic depiction of a prior art system 100 for allocating compute farm resources 105, the system 100 employs a typical compute farm job scheduler 110. Scheduling compute farm resources 105 typically involves the scheduler 110 reviewing the workload 115 (i.e., the collection of pending individual jobs) and available compute farm resources 105 (i.e., CPUs, licenses, etc.), followed by allocating resources 125 such that individual jobs of the workload 115 are assigned to specific time periods 130 with specific resources 105. The allocating of resources 125 is based on the available resources 105 as well as scheduling policies 135, constraints 140, priorities 145, and SLAs 150. A set of such operations is repeated over several iterations. At the beginning of each iteration, new jobs and resources as well as the updated status from existing jobs and resources are collected.

In a large-scale environment, two aspects of scheduling are important. First, all SLAs, policies, priorities and constraints must be met in order for the scheduler to correctly perform its job. Second, scheduling needs to be quick in order to keep the utilization high. A large-scale compute farm has a higher overall job completion rate than a smaller farm for the same types of jobs. Longer scheduling time will result in a higher number of resources being left idle while the next scheduling iteration completes.

The importance of scheduling speed is evidenced by the following example. Consider a 5,000 CPU compute farm catering to electronic design automation ("EDA") jobs submitted by 1000 microprocessor designers from 20 distinct projects. In such an environment, a large percentage of the jobs typically run for 20-30 minutes. Assuming 30 minutes as an average runtime, there would be 10,000 jobs completed via the 5,000 CPUs in an hour. On average, therefore, there would be about 166 CPUs made idle in a minute. This implies the farm would be leaving about 166 CPUs, or 3.33% of the compute farm capacity, idle if a scheduling iteration takes 60 seconds. If the scheduling iterations take 5 minutes, then about 833 CPUs, or 16.66% of the compute farm capacity, would be left idle constantly. A similar percentage of licenses would also be left unused as can be seen by repeating the calculations for licenses instead of CPUs. The result is inefficiency due to idle resources. More resources, for example, CPUs and licenses, would have to be purchased to perform the same amount of work. Such resources are expensive, and inefficient utilization of resources has a negative impact on time to market, amongst other negative imports.

Long scheduling iterations present other problems besides inefficient utilization of compute farm resources. For example, long scheduling iterations result in newly submitted jobs having to wait until the start of the next iteration to be scheduled. Long iteration times negatively impact jobs with a high priority or of an interactive nature that need to be scheduled and run immediately.

Scheduling a large number of jobs over a large number of CPUs and licenses is a time consuming operation. A state of the art scheduler performs numerous operations and evaluates several scheduling scenarios within each iteration. Several factors can increase the time to complete one scheduling iteration. These factors include: the number of jobs waiting for resource allocation; the total number of CPUs; the number of idle CPUs on which to schedule jobs; the number of licenses available for jobs to be scheduled; the variety of the job mix (i.e., the number of distinct types of jobs); and the number and type of scheduling constraints. The number and type of scheduling constraints can be share tree based project allocation, limits on resource usage per user, project, job type, etc., or time and/or data based dependencies.

A large scale, highly utilized farm exacerbates the problems associated with the efficient use of compute farm resources by increasing the numbers for all of the above-listed factors. The faster the scheduling iteration, the easier it gets to utilize all of the CPUs and licenses that become idle. A slower scheduling iteration can make every subsequent iteration longer due to an increasing number of idle CPUs. This situation can spiral itself and result in very low utilization of the farm. Benefits of farm based computing then disappear.

A significant amount of research has focused on the sophistication as well as accuracy of job scheduling algorithms for compute farms and parallel job environments. Algorithms and techniques have been proposed to achieve optimizations in resource utilization, but have not directly addressed the effect of scheduling iteration time on resource utilization. Two relevant examples are included below.

In a 2004 IEEE workshop, a two stage static-dynamic optimization of job scheduling and assignment of resources was proposed. Such job scheduling employs a technique that achieves sophisticated scheduling of jobs by combining complex algorithms including advance reservation as well as back filling. Each scheduling iteration evaluates several critical job attributes to calculate global priorities that are automatically normalized. High utilization of resources was achieved in each scheduling iteration as shown by a sample scenario with complex requirements. However, the speed of the scheduling algorithm was not addressed. In a large scale compute farm, the amount of calculations that would need to be performed would rise dramatically, thereby leaving more resources idle while the next set of schedules are determined. For greater detail regarding the proposed two stage optimization, see Lev Markov, "Two Stage Optimization of Job Scheduling and Assignment in Heterogeneous Compute Farms," Proceedings of the 10$^{th}$ IEEE International Workshop on Future Trends of Distributed Computing Systems (FTDCS '04) 2004. This reference is incorporated by reference in its entirety into the present application.

In another workshop in 1999, a strategy was proposed for designing a job scheduling system. The scheduling system included three critical parts, which were scheduling policy, objective function, and a scheduling algorithm. The policy captures resource allocation rules, generally defined by resource owners and/or administrators. The objective function captures a measure of the adequacy of the system-generated schedules. The scheduling algorithm generates valid schedules for the jobs over the available resources. However, the proposed strategy fails to address the impact of the speed of the algorithm on resource utilization. Generating good schedules was the primary focus. For greater detail regarding the proposed strategy, see J. Krallman, U. Schwiegelshohn, R. Yahyapur, "On the Design and Evaluation of Job Scheduling Algorithms," $5^{th}$ Workshop on Job Scheduling Strategies for Parallel Processing, pp. 17-42, 1999. This reference is incorporated by reference in its entirety into the present application.

There is a need in the art for an apparatus and system for rapid resource scheduling in a compute farm. There is also a need in the art for a method for rapid resource scheduling in a compute farm.

SUMMARY

Disclosed herein is a method for scheduling computing jobs for a compute farm. In one embodiment, the method includes: receiving a plurality of computing jobs at a scheduler; assigning a signature to each computing job based on at least one computing resource requirement of the computing job; storing each computing job in a signature classification corresponding to the signature of the computing job; and scheduling at least one of the plurality of computing jobs for processing in the compute farm as a function of the signature classification.

Disclosed herein is a system for scheduling computing jobs for a compute farm. In one embodiment, the system includes a scheduler including a processor and storage. The processor causes each computing job provided to the scheduler to be assigned a signature based on at least one computing resource requirement of the computing job. The processor causes each computing job to be assigned to a signature classification within the storage corresponding the signature of the computing job. The scheduler schedules at least one of the computing jobs for processing in the compute farm as a function of the signature classification.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION OF EMBODIMENTS OF THE INVENTION

Figure 1:
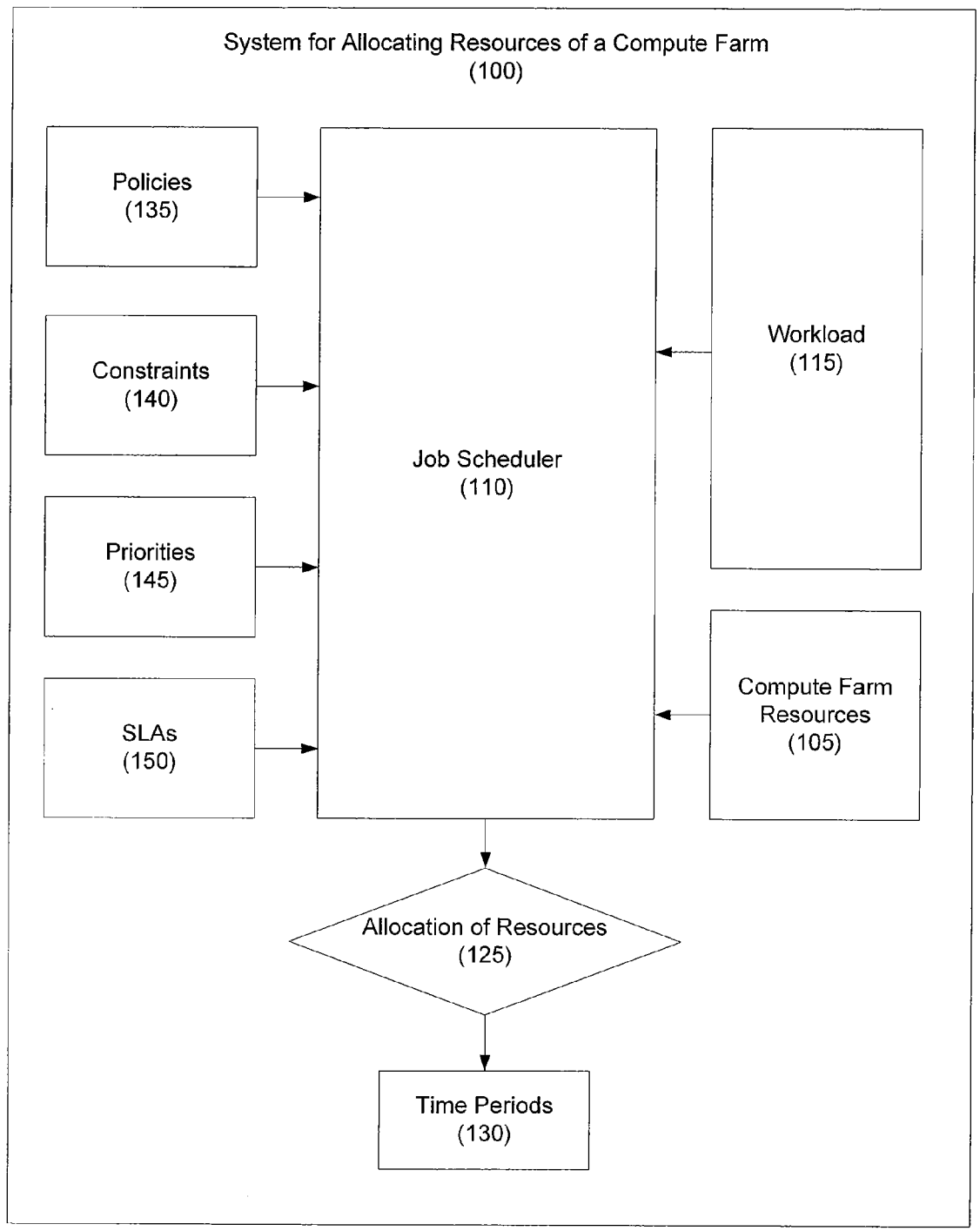
FIG. 1 is a diagrammatic depiction of a prior art system for allocating compute farm resources.

Disclosed herein is a system 200 for scheduling the workload (e.g., computing jobs) of a compute farm 205, wherein the workload is a number of individual jobs 210 received from a number of clients 215. The scheduling system 200 achieves rapid scheduling by reducing the number of jobs needing to be scheduled in each scheduling iteration, while still meeting the requirements of all SLAs 220 and/or policies 225, constraints 230 and priorities 235 and without negatively impacting the correctness of the schedules obtained.

Figure 2A:
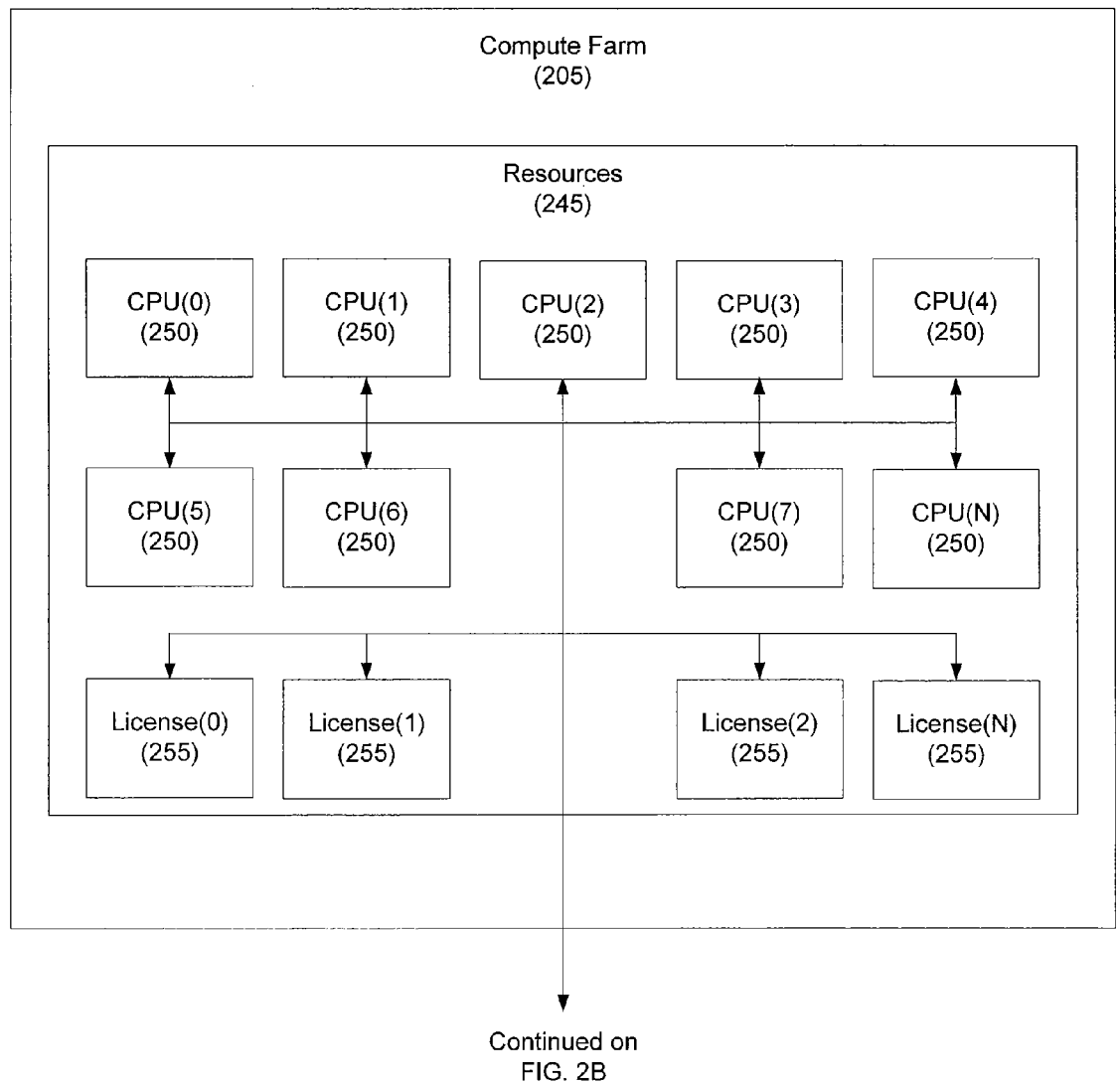
FIG. 2A is a diagrammatic depiction of a compute farm portion of a system for scheduling the workload of a compute farm.
Figure 2B:
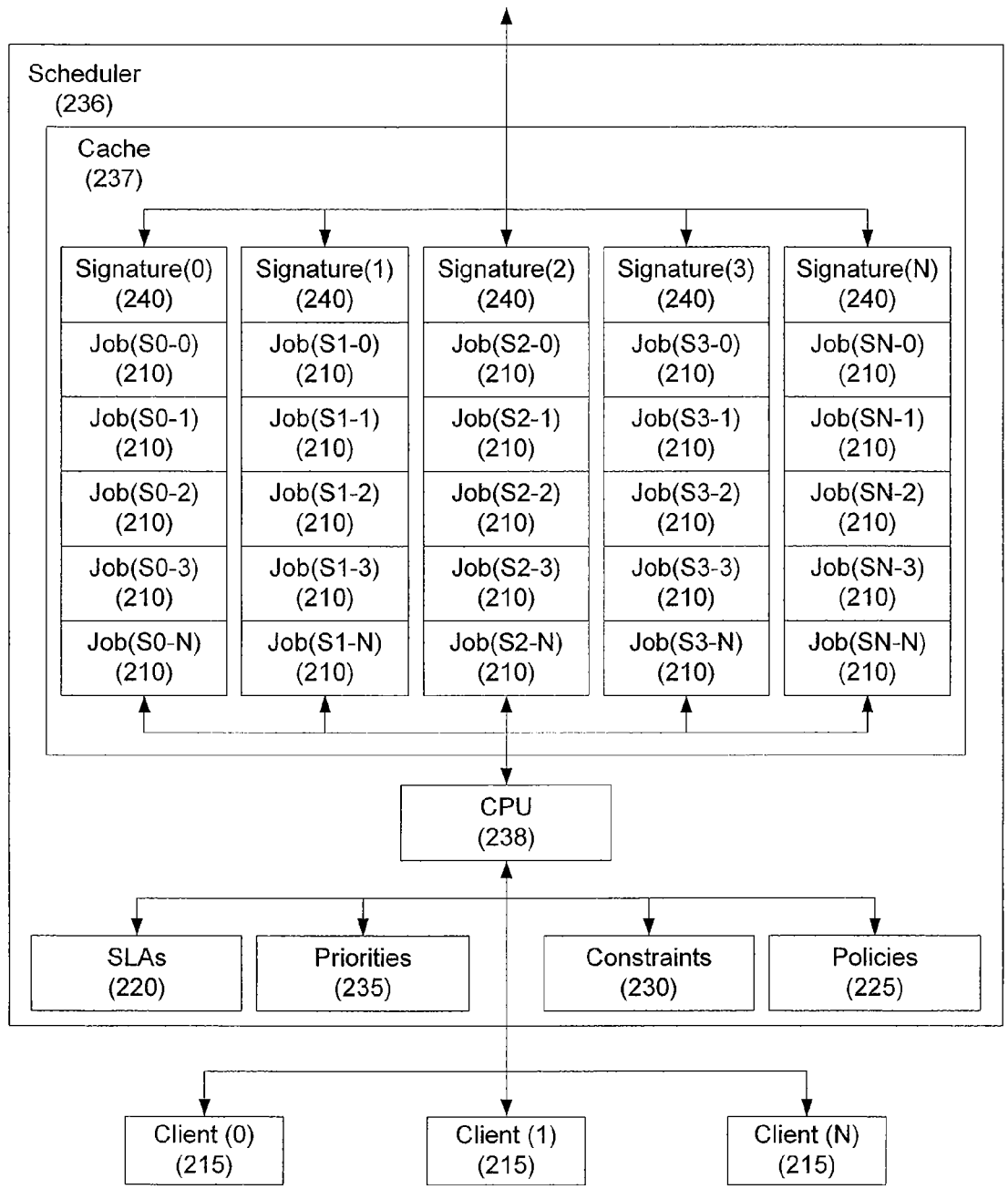
FIG. 2B is a diagrammatic depiction of a scheduler portion of a system for scheduling the workload of a compute farm.

As can be understood from FIGS. 2A and 2B, which are diagrammatic depictions of compute farm and scheduler portions of the system 200, in one embodiment, the system 200 includes a compute farm 205 and a scheduler 236. The scheduler 236 may include a cache 237, a CPU 238, SLAs 220, priorities 235, constraints 230 and policies 225. The cache 237 includes a number of signature classifications 240, and each job 210, upon being received by the scheduler 236 from a client 215, is stored in the signature classification 240 corresponding to the signature of the job 210.

In some embodiments, example signatures 240 may appear and be related to "Clients", "Memory", "CPUs" and "License (s)" as indicated in the following TABLE 1.

TABLE 1

| Signature | Client | Memory | CPUs | License(s) |
| --- | --- | --- | --- | --- |
| Qwemz0t+kHWJi6W3InO1K8EJTEo | A | 4000 | 1.0 | NONE |
| HZSs7UZio8KM9atP4r1r857/PU0 | B | 4096 | 1.0 | NONE |
| pC19Y9q5tkPK7oI0DaP43bsMfUA | C | 4096 | 1.0 | NONE |
| iuSA5NyFHVA0kfMTGL3nY4YpkWs | D | 1000 | 1.0 | 1 of L1, 1 of L2 |
| GObI6YcSAsvtwQNcTroOvHgR9gc | E | 1280 | 1.0 | 1 of L3, 1 of L4 |
| L6Ys7pOaQyoSVknwcfMe1C8Z9+A | F | 8192 | 1.0 | NONE |
| rW6f+CXFS2EVkWdIU47vAokYtQM | G | 1000 | 1.0 | 1 of L5 |

The CPU 238 of the scheduler 236 assigns a job 210 a signature based on the job's resource requirements received from the client 215 and stores the job 210 in the cache 237 under the corresponding signature classification 240. As described below in greater detail, the CPU 238 of the scheduler 236 assigns the jobs 210 to the resources 245 of the compute farm 205 according to the availability of the resources 245 and the requirements of the SLAs 220, policies 225, constraints 230 and priorities 235.

The resources 245 of the compute farm 205 may include a number of CPUs 250 and a number of licenses 255. For example, the compute farm resources 245 may include hundreds or thousands of CPUs 250, hundreds or thousands of a first type of license 255, a few of a second type of license 255, and so forth.

An example of a policy 225 would be to require that a certain job 210 gets a certain percentage of the compute farm resources 245 and another certain job 210 gets another certain percentage of the resources 245, so both of the jobs 210 can be worked and are guaranteed a certain minimum. An example of constraint 230 would be to mandate that no job 210 or client 215 can consume more than a certain percentage of the compute farm resources 245 at any one time. An example of a priority would be to identify a certain job 210 or signature classification 240 as being critical to complete as soon as possible, while another certain job 210 of signature classification 240 is less critical to complete.

Figure 3:
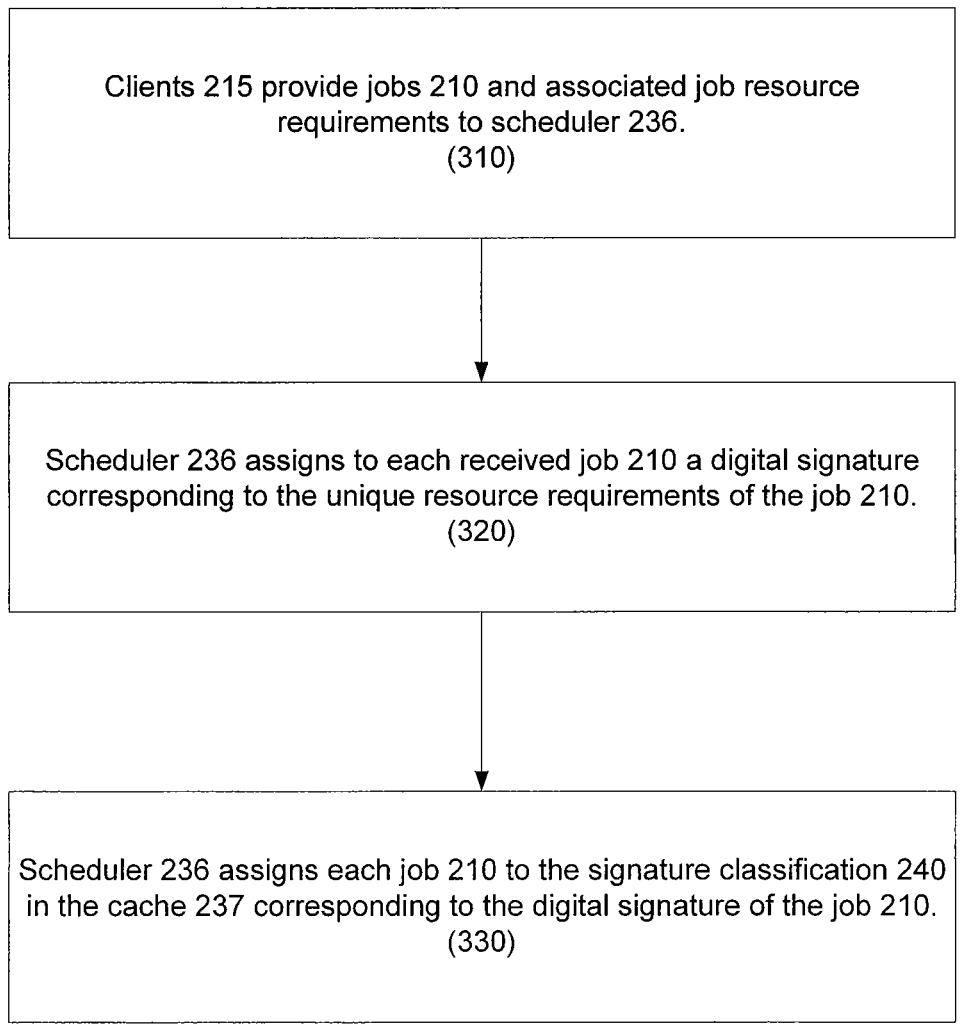
FIG. 3 is a process flow chart of a job cache iteration.

For a detailed discussion regarding a job caching process performed by the system 200, reference is made to FIGS. 2B and 3, wherein FIG. 3 is a process flow chart of a job cache iteration 300. As can be understood from FIGS. 2B and 3, during the job cache iteration 300, clients provide jobs 210 and associated job resource requirements to the scheduler 236 (operation 310). The scheduler 236 assigns to each received job 210 a digital signature corresponding to the unique resource requirements of the job 210 (operation 320). The scheduler 236 assigns each job 210 to the signature classification 240 in the cache 237 corresponding to the digital signature of the job 210 (operation 330).

The job resource requirements of a specific signature classification 240 may correspond to all jobs 210 requiring a certain memory requirement and certain licenses, and, perhaps, having certain SLAs 220, policies 225, constraints 230 and priorities 235 associated with the jobs. For example, as can be understood from FIG. 2B, the job resource requirements corresponding to signature classification 240 "Signature(0)" may be all jobs requiring 2 Gbytes or less of memory and one "license(0)" 255, wherein the compute farm 205 has 1000 such licenses 255. Additionally, job resource requirements corresponding to signature classification 240 "Signature(0)" may have a SLA 220 that requires a job 210 to be run within 48 hours of receipt by the scheduler 236.

The job resource requirements corresponding to signature classification 240 "Signature(1)" may, for example, be all jobs requiring memory of greater than 2 Gbytes and less than or equal to 4 Gbytes, one "license(0)" 255 and one "license (1)" 255, wherein the compute farm 205 has, respectively, 1000 and 100 such licenses 255. Additionally, job resource requirements corresponding to signature classification 240 "Signature(1)" may have a SLA 220 that requires a job 210 to be run within 24 hours of receipt by the scheduler 236. Other signature classifications 240, for example, signature classification 240 "Signature(2)", may be generally the same as signature classification 240 "Signature(1)", except, for example, signature classification 240 "Signature(2)" may require only "license(0)" 255 and no "license(1)" 255. Similarly, yet other signature classifications 240, for example, signature classification 240 "Signature(3)", may be generally the same as signature classification 240 "Signature(1)", except, for example, signature classification 240 "Signature (3)" may require memory of greater than 4 Gbytes and less than 50 Gbytes.

The job resource requirements corresponding to signature classification 240 "Signature(N)" may, for example, be all jobs requiring memory of greater than 50 Gbytes, one "license(2)" 255 and one "license(N)" 255, wherein the compute farm 205 has, respectively, 50 and five such licenses 255. Additionally, job resource requirement corresponding to signature classification 240 "Signature(N)" may have a high priority 235, a SLA 220 that requires a job 210 to be run within 10 hours of receipt by the scheduler 236, and a policy 225 that says a job 210 gets a minimum of 10 percent of the CPUs 255 compute farm 205 once the job 210 has begun to run.

It should be understood the preceding examples regarding job resource requirements corresponding to signature classifications 240 are provided purely for example and should not be considered as the only ways of categorizing job resource requirements. Accordingly, the preceding examples should not be used to limit the embodiments disclosed herein.

As can be understood from FIG. 2B, the job cache iteration 300 may operate as follows. Multiple clients 215 provide, for example, ten jobs 210 to the scheduler 236 along with the job resource requirements for each job 210. Three of the jobs 210 may each have job resource requirements that correspond to signature classification 240 "Signature(0)". As a result, the scheduler CPU 238 causes these jobs 210 to be stored in the cache 237 under signature classification 240 "Signature(0)" as jobs 210 "S0-0", "S0-1" and "S0-2".

The remaining seven of the ten jobs 210 may also be cached as follows. One, zero, four and two jobs may each respectively have job resource requirements that correspond to signature classifications 240 "Signature(1)", "Signature(2)", "Signature(3)" and "Signature(N)". Thus, in this example scenario, the scheduler CPU 238 will cause these jobs 210 to be stored in the cache 237 under signature classifications 240 "Signature(1)", "Signature(3)" and "Signature(N)" as jobs 210 "S1-0", "S3-0", "S3-1", "S3-2", "S3-3", "SN-0" and "SN-1". No jobs 210 are stored under signature classification 240 "Signature(2)" because the clients 215 provided no jobs 210 to the scheduler 236 having job resource requirements corresponding to the signature classification 240 "Signature (2)".

It should be understood the preceding examples regarding jobs 210 being provided to the scheduler 236 and the scheduler CPU 238 caching the jobs 210 are provided purely for exemplary purposes and should not be considered as the only numbers and types of jobs that will be provided to and assigned by the scheduler 236. Accordingly, the preceding examples should not be used to limit the embodiments disclosed herein.

For a detailed discussion regarding a job scheduling process performed by the system 200, reference is made to FIGS. 2B and 4A-4D, wherein FIGS. 4A-4D are various portions of a process flow chart of a job scheduling iteration 400. As can be understood from FIG. 4A, the scheduling iteration is initiated for the scheduler 236 (operation 405). The scheduler CPU 238 determines whether there is one or more signature classifications 240 identified as being "hard-to-schedule" that have not had their scheduling completed for the current scheduling iteration (operation 410).

Depending on the embodiment, the scheduler 236 will classify a received job 210 as "hard-to-schedule" immediately or "easy-to-schedule" immediately. The administrator can determine which types of resource requirements will be classified as being "hard-to-schedule" and which will be classified as being "easy-to-schedule".

Because each job 210 is assigned to a signature classification 240 containing other jobs 210 with the same or substantially similar resource requirements, a job classified as "hard-to-schedule" will be placed in a signature classification 240 that is classified as "hard-to-schedule" (i.e., the signature classification contains jobs 210 that are "hard-to-schedule"). Similarly, a job classified as "easy-to-schedule" will be placed in a signature classification 240 that is classified as "easy-to-schedule" (i.e., the signature classification contains jobs 210 that are "easy-to-schedule").

Reasons for a job 210 and its corresponding signature classification 240 being considered "hard-to-schedule" immediately include requiring resources 245 that are scarce and/or large amounts of resources. For example, a job 210 requiring eight CPUs 250 is generally harder to schedule in a compute farm 205 that primarily have jobs requiring one CPU and job runtimes that vary widely. This is because one must wait until eight CPUs 250 are simultaneously available on the same execution host for the job to dispatch. The mix of execution hosts available also has an impact on the ease of scheduling such jobs. The fewer the hosts with at least eight CPUs 250, the harder it is to find a suitable host on which to run the job. Similarly, a job requiring 50 Gbytes of memory is harder to schedule when most jobs require two to ten Gbytes of memory and the utilization in the farm is close to 100 percent.

A job 210 may require a first type of license 255 and a second type of license 255. The compute farm 205 may have 1000 of the first type of licenses and only five of the second type of licenses. The job is harder to immediately schedule because it requires a scarce resource 245, i.e., the second type of license. Another job may require only the first type of license and, therefore is much easier to schedule because it relies on a much more plentiful resource 245, i.e., the first type of license. Thus, jobs 210 requiring large or special resources 245 are classified as "hard-to-schedule" immediately and jobs requiring small or less special resources 245 are classified as "easy-to-schedule" immediately. As can be understood from FIG. 4A and the following discussion, in one embodiment, the jobs 210 and/or signature classifications 240 classified as "hard-to-schedule" immediately are given first preference for scheduling, as advance reservation of resources 245 for such jobs 210 is more important than for other jobs wherein resources are readily available within a scheduling iteration.

Figure 4A:
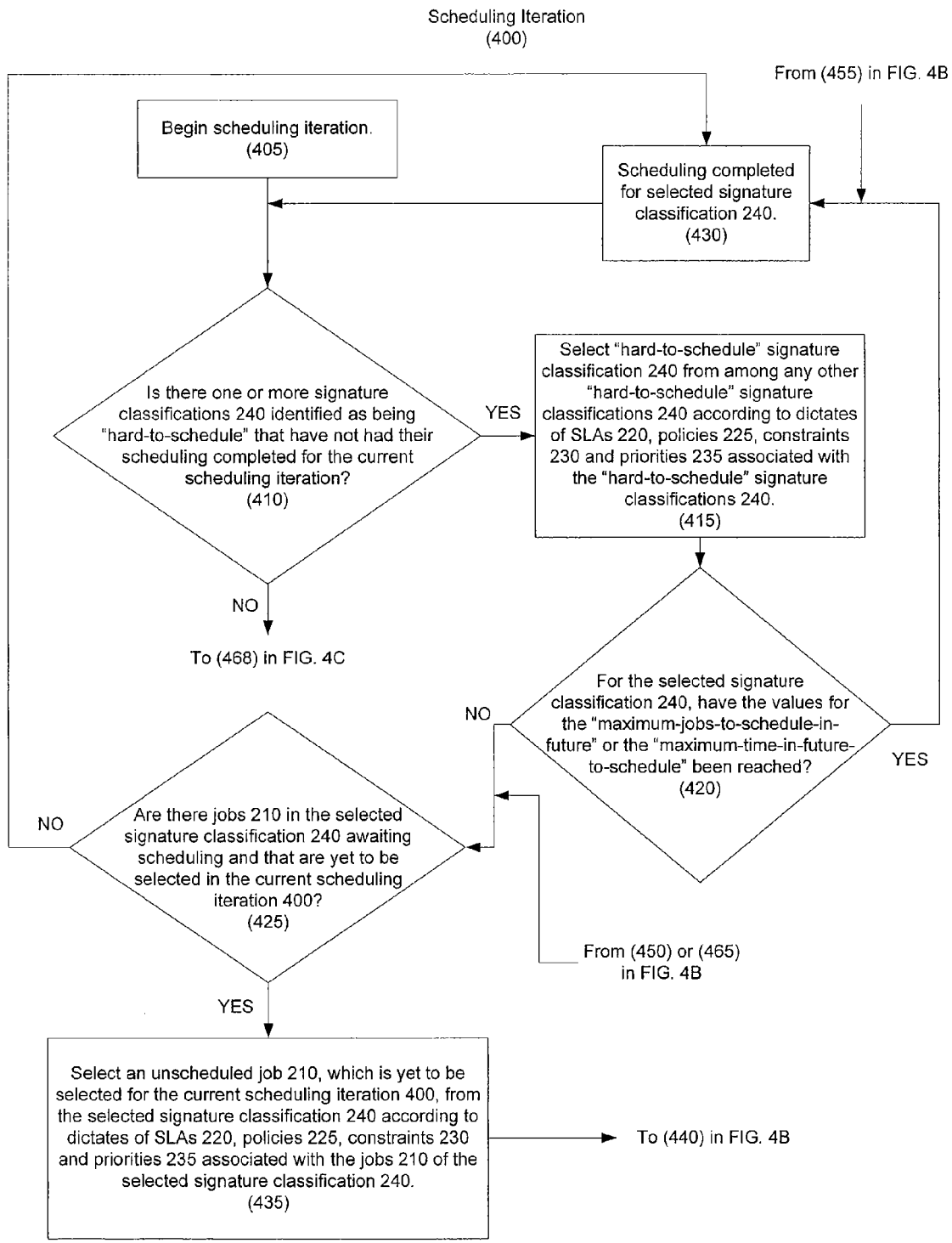
FIGS. 4A-4D are various portions of a process flow chart of a job scheduling iteration.

As indicated in FIG. 4A, a "hard-to-schedule" signature classification 240 is selected from among any other "hard-to-schedule" signature classifications 240 according to the dictates of SLAs 220, policies 225, constraints 230 and priorities 235 associated with the "hard-to-schedule" signature classifications 240 (operation 415). The scheduler CPU 238 then determines whether, for the selected signature classification 240, the values for the "maximum-jobs-to-schedule-in-future" or the "maximum-time-in-future-to-schedule" been reached (operation 420). This is because the scheduler 236 has four configuration controls provided to it that indicate preferences for the local site at which the scheduler is run. The four configuration controls are: minimum-jobs-to-schedule-in-future; maximum-jobs-to-schedule-in-future; minimum-time-in-future-to-schedule; and maximum-time-in-future-to-schedule. As will be understood from FIGS. 4C and 4D, the "minimum" jobs and time configuration controls are used with respect to the "easy-to-schedule" jobs, in one particular implementation. As will be understood from FIGS. 4A and 4B, the "maximum" jobs and time configuration controls are used with respect to the "hard-to-schedule" jobs, in one particular implementation.

The minimum-jobs-to-schedule-in-future is the minimum jobs 210 for a given signature classification 240 to schedule in the future if resources 245 are not available to run the jobs immediately. The maximum-jobs-to-schedule-in-future is the maximum number of jobs 210 for a given signature classification 240 to schedule in the future if resources 245 are not available to run the jobs immediately. This value is greater than or equal to the minimum-jobs-to-schedule-in-future.

The minimum-time-in-future-to-schedule is the minimum amount of time in the future for which to schedule jobs of a signature classification 240 if resources 245 are not available to run the jobs immediately. The maximum-time-in-future-to-schedule is the maximum amount of time in the future for which to schedule jobs of a signature classification 240 if resources 245 are not available to run the jobs immediately. This value is greater than or equal to the minimum-time-in-future-schedule.

If the answer to (operation 420) is yes, then the scheduling is complete for the selected signature classification 240 for the current scheduling iteration 400 (operation 430), and the scheduling process returns to (operation 410). Thus, no further time is wasted dealing with the selected signature classification or the jobs contained therein for the current scheduling iteration.

If the answer to (operation 420) is no, then the scheduler CPU 238 determines if there are jobs 210 in the selected signature classification 240 awaiting scheduling and that are yet to be selected in the current scheduling iteration 400 (operation 425). If the answer to (operation 425) is no, then the scheduling is complete for the selected signature classification 240 for the current scheduling iteration 400 (operation 430), and the scheduling process returns to (operation 410). Thus, no further time is wasted dealing with the selected signature classification or the jobs contained therein for the current scheduling iteration.

If the answer to (operation 425) is yes, then the scheduler CPU 238 selects an unscheduled job 210, which is yet to be selected for the current scheduling iteration 400, from the selected signature classification 240 according to the dictates of SLAs 220, policies 225, constraints 230 and priorities 235 associated with the jobs 210 of the selected signature classification 240 (operation 435).

Figure 4B:
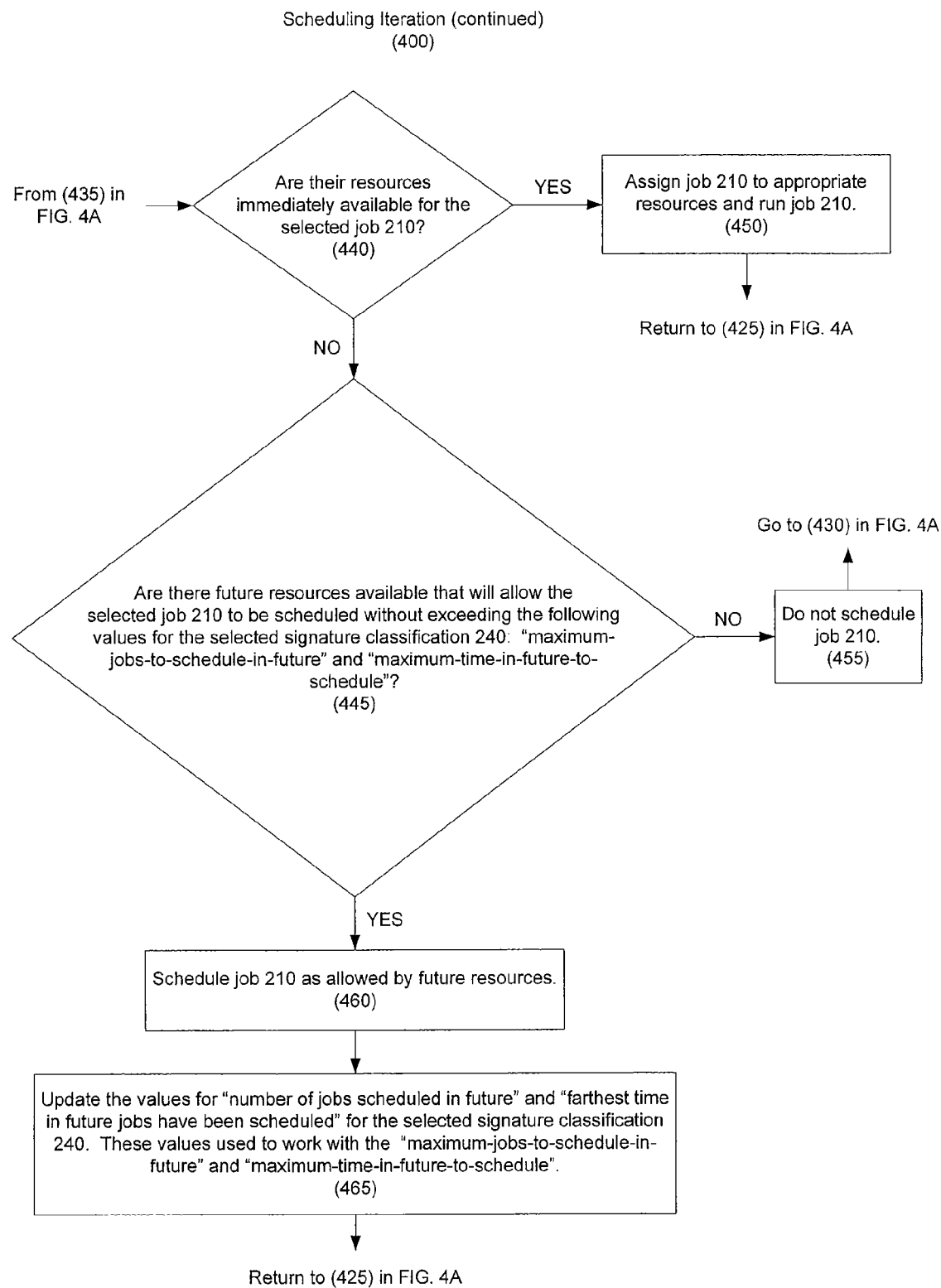

As illustrated in FIG. 4B, the scheduler CPU 238 determines if resources 245 are immediately available for the selected job 210 (operation 440). If the answer to (operation 440) is yes, then the CPU 238 assigns the job 210 to the appropriate resources 245 and runs the job 210 (operation 450). The scheduling process then returns to (operation 425).

If the answer to (operation 440) is no, then the CPU 238 determines if there are future resources 245 available that will allow the selected job 210 to be scheduled without exceeding the following values for the selected signature classification 240: "maximum-jobs-to-schedule-in-future" and "maximum-time-in-future-to-schedule" (operation 445). If the answer to (operation 445) is no, then the job 210 is not schedule during the present scheduling iteration 400, but is saved in the same signature classification 240 until at least a later scheduling iteration (operation 455). The scheduling is complete for the selected signature classification 240 for the current scheduling iteration 400 (operation 430), and the scheduling process returns to (operation 410). Thus, no further time is wasted dealing with the selected signature classification or the jobs contained therein for the current scheduling iteration.

If the answer to (operation 445) is yes, then the job 210 is scheduled for future resources 245 as allowed by the availability of the future resources (operation 460). The values for "number of jobs scheduled in future" and "farthest time in future jobs have been scheduled" for the selected signature classification 240 are updated (operation 465). These values are used to work with the "maximum-jobs-to-schedule-in-future" and "maximum-time-in-future-to-schedule". The "number of jobs scheduled in future" indicates the number of jobs of a given signature classification that have already been scheduled in the future during the current scheduling iteration. The "farthest time in future jobs have been scheduled" indicates the maximum time in the future for which jobs of a given signature classification has already been scheduled during the current scheduling iteration. These two values are maintained and dynamically updated for each signature classification during a scheduling iteration. Once these values are updated, the scheduling process returns to (operation 425).

Figure 4C:
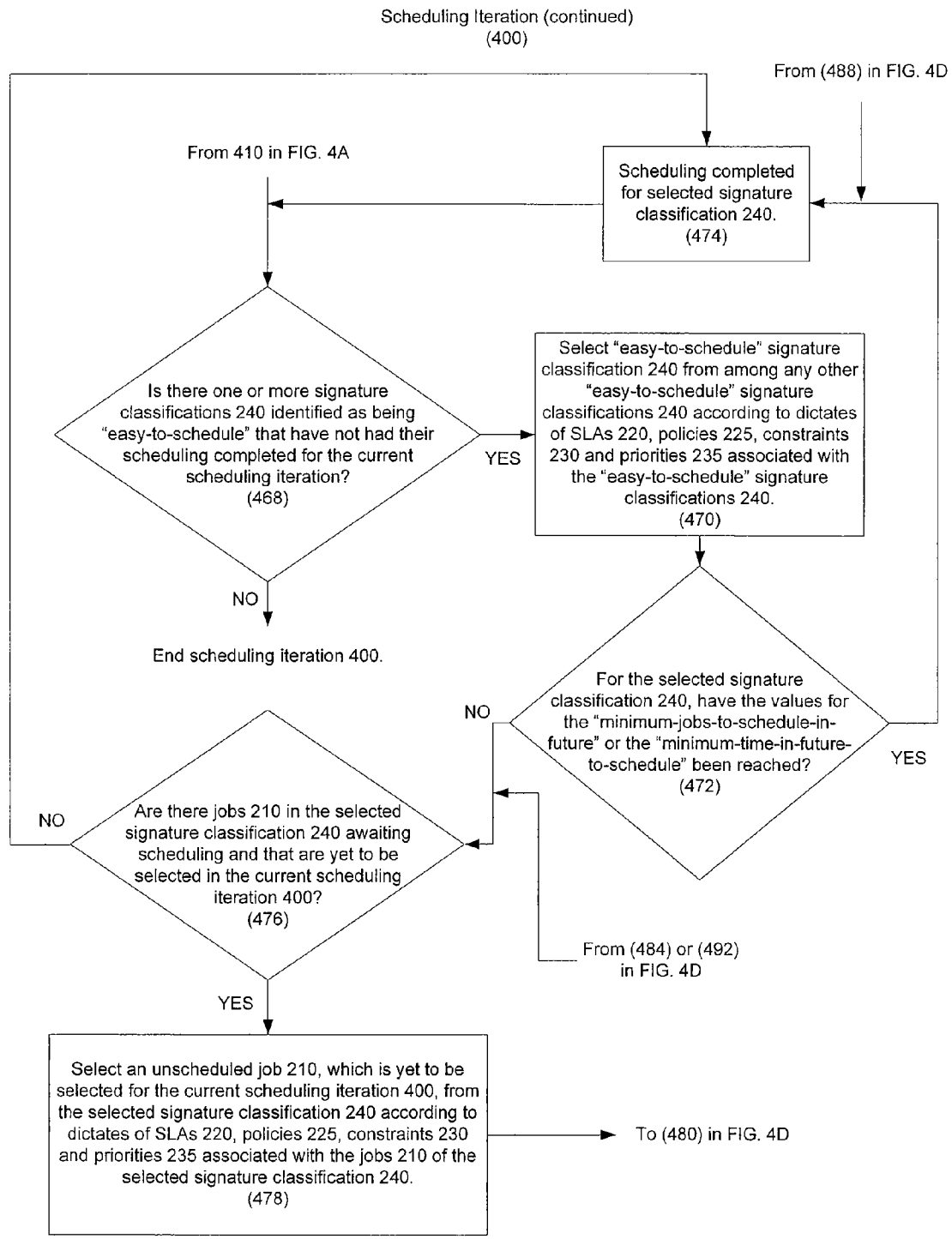
Figure 4D:
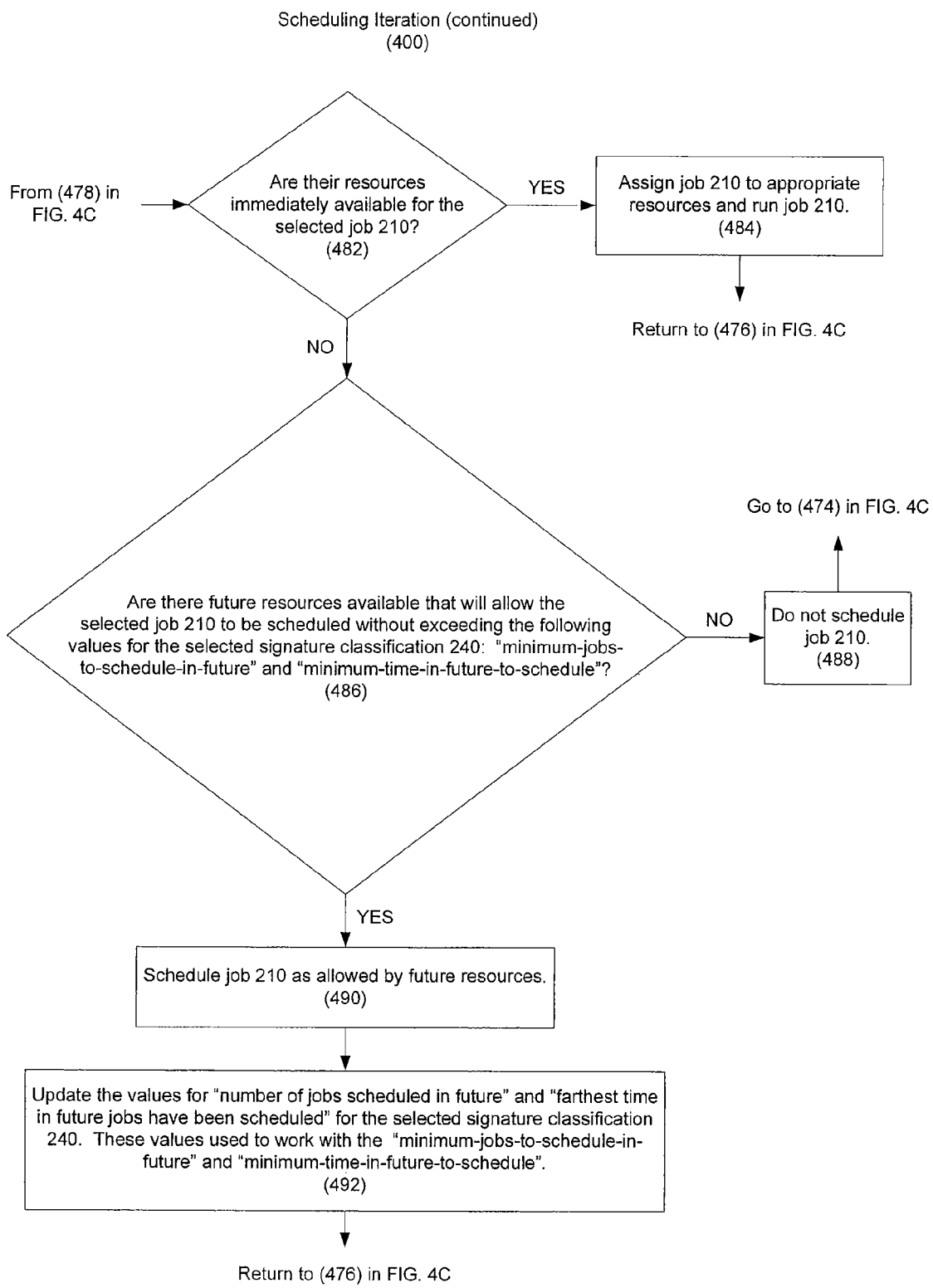

As can be understood from FIG. 4A, if the answer to (operation 410) is no, either because there was never any "hard-to-schedule" signature classifications 240 for the current scheduling iteration 400 or all of the "hard-to-schedule" signature classifications 240 were addressed during the current scheduling iteration 400, the scheduling process will go to (operation 468) in FIG. 4C.

As shown in FIG. 4C, the CPU 238 will determine if there is one or more signature classifications 240 identified as being "easy-to-schedule" that have not had their scheduling completed for the current scheduling iteration (operation 468). If the answer to (operation 468) is no, then the current scheduling iteration 400 can end, and a new scheduling iteration can begin. If the answer to (operation 468) is yes, then the CPU 238 selects an "easy-to-schedule" signature classification 240 from among any other "easy-to-schedule" signature classifications 240 according to the dictates of SLAs 220, policies 225, constraints 230 and priorities 235 associated with the "easy-to-schedule" signature classifications 240 (operation 470).

The scheduler CPU 238 determines if, for the selected signature classification 240, the values for the "minimum-jobs-to-schedule-in-future" or the "minimum-time-in-future-to-schedule" been reached (operation 472). If the answer to (operation 472) is yes, then the scheduling is complete for the selected signature classification 240 for the current scheduling iteration 400 (operation 474), and the scheduling process returns to (operation 468). Thus, no further time is wasted dealing with the selected signature classification or the jobs contained therein for the current scheduling iteration.

If the answer to (operation 472) is no, then the scheduler CPU 238 determines if there are jobs 210 in the selected signature classification 240 awaiting scheduling and that are yet to be selected in the current scheduling iteration 400 (operation 476). If the answer to (operation 476) is no, then the scheduling is complete for the selected signature classification 240 for the current scheduling iteration 400 (operation 474), and the scheduling process returns to (operation 468). Thus, no further time is wasted dealing with the selected signature classification or the jobs contained therein for the current scheduling iteration.

If the answer to (operation 476) is yes, then the scheduler CPU 238 selects an unscheduled job 210, which is yet to be selected for the current scheduling iteration 400, from the selected signature classification 240 according to the dictates of SLAs 220, policies 225, constraints 230 and priorities 235 associated with the jobs 210 of the selected signature classification 240 (operation 478).

As illustrated in FIG. 4C, the scheduler CPU 238 determines if resources 245 are immediately available for the selected job 210 (operation 482). If the answer to (operation 482) is yes, then the CPU 238 assigns the job 210 to the appropriate resources 245 and runs the job 210 (operation 484). The scheduling process then returns to (operation 476).

If the answer to (operation 482) is no, then the CPU 238 determines if there are future resources 245 available that will allow the selected job 210 to be scheduled without exceeding the following values for the selected signature classification 240: "minimum-jobs-to-schedule-in-future" and "minimum-time-in-future-to-schedule" (operation 486). If the answer to (operation 486) is no, then the job 210 is not schedule during the present scheduling iteration 400, but is saved in the same signature classification 240 until at least a later scheduling iteration (operation 488). The scheduling is complete for the selected signature classification 240 for the current scheduling iteration 400 (operation 474), and the scheduling process returns to (operation 468). Thus, no further time is wasted dealing with the selected signature classification or the jobs contained therein for the current scheduling iteration.

If the answer to (operation 486) is yes, then the job 210 is scheduled for future resources 245 as allowed by the availability of the future resources (operation 490). The values for "number of jobs scheduled in future" and "farthest time in future jobs have been scheduled" for the selected signature classification 240 are updated (operation 492). These values are used to work with the "minimum-jobs-to-schedule-in-future" and "minimum-time-in-future-to-schedule". The "number of jobs scheduled in future" indicates the number of jobs of a given signature classification that have already been scheduled in the future during the current scheduling iteration. The "farthest time in future jobs have been scheduled" indicates the maximum time in the future for which jobs of a given signature classification has already been scheduled during the current scheduling iteration. These two values are maintained and dynamically updated for each signature classification during a scheduling iteration. Once these values are updated, the scheduling process returns to (operation 476).

As can be understood from FIG. 4C, if the answer to (operation 468) is no, either because there was never any "easy-to-schedule" signature classifications 240 for the current scheduling iteration 400 or all of the "easy-to-schedule" signature classifications 240 were addressed during the current scheduling iteration 400, the current scheduling iteration 400 will end, and another scheduling iteration 400 can begin as indicated at (operation 405).

It should be noted that while the above-described example scheduling process and associated figures describe a process wherein the order of selecting job signatures includes first selecting the "hard-to-schedule" job signatures followed by selecting the "easier-to-schedule" job signatures, those skilled in the art will readily understand that the principles disclosed herein can be applied in other processes without departing from the scope of the methods and systems disclosed herein. For example, in some embodiments of the methods and systems disclosed herein, both the "hard-to-schedule" job signatures and "easier-to-schedule" job signatures are selected together without having to first address the "hard-to-schedule" job signatures before addressing the "easier-to-schedule" job signatures. In other words, the selection of the "hard-to-schedule" job signatures and the "easier-to-schedule" job signatures occurs in a mixed process employing the same or similar actions for each job signature as described above.

In a large-scale compute farm, the number of jobs for each distinct signature can be very large. Therefore, the number of jobs that need to be scheduled in the future is drastically cut down due to these above-described processes. In an experiment repeated from data obtained from a real compute farm workload, the time to complete one scheduling iteration was reduced from five minutes to 15 seconds. The experiment had over 500 distinct job signatures from over 17,000 distinct jobs being scheduled over more than 5,000 CPUs residing on approximately 1,500 execution hosts. There was wide variation in the number of resources as well as the amounts of each resource required by the jobs. For example, the requirements on CPUs per job varied from 0.5 to 8. The requirement on memory varied from 500 Mbytes to 60,000 Mbytes. The license requirement ranged from zero to three different types.

In one embodiment, the system disclosed herein uses signatures of jobs, wherein the signatures represent distinct resource requirements, to dynamically analyze the time available in the future to schedule some jobs and not others. This reduces the time required to run a scheduling iteration in a highly utilized large-scale compute farm by orders of magnitude. Reducing the scheduling iteration time allows the scheduling system to remain more responsive to newly submitted jobs as well as quickly fill up newly available CPUs due to recently finished jobs.

It should be noted that, while the embodiments described herein may be performed under the control of a programmed processor, in alternative embodiments, the embodiments may be fully or partially implemented by any programmable or hardcoded logic, such as field programmable gate arrays (FPGAs), transistor transistor logic (TTL), or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention.

Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, PROM, EPROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications link or connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

I hereby claim:

1. A method for scheduling computing jobs for a compute farm, the method comprising:
receiving a plurality of computing jobs at a scheduler;
assigning a signature to each computing job based on at least one computing resource requirement of the computing job;
storing each computing job in a signature classification corresponding to the signature of the computing job;
assigning a hard to schedule indication to a first signature classification and an easy to schedule indication to a second signature classification, wherein the hard to schedule indication indicates a signature classification with computing jobs with resource requirements that include at least one of rare resources and large amounts of resources;
selecting the first signature classification;
determining if a computing job of the first signature classification can be scheduled during a first scheduling iteration, wherein if the computing job of the first signature classification cannot be scheduled during the first scheduling iteration, performing the operations of:
considering scheduling complete for the first signature classification and selecting the second signature classification;
determining a minimum number of computing jobs criteria for the second signature classification; and
scheduling at least one computing job of the second signature classification based on the determined minimum number of computing jobs criteria; and
wherein if the computing job of the first signature classification can be scheduled during the first scheduling iteration, scheduling the computing job of the first signature classification for processing in the compute farm as a function of the signature classification.

2. The method of claim 1, further comprising characterizing signature classifications as having a high priority or a low priority with respect to performing a scheduling iteration.

3. The method of claim 2, wherein the high priority signature classifications are those containing computing jobs with resource requirements that include at least one of rare resources and large amounts of resources.

4. The method of claim 3, wherein a rare resource is a license.

5. The method of claim 3, further comprising addressing the high priority signature classifications with respect to scheduling before addressing the low priority signature classifications with respect to scheduling.

6. The method of claim 1, further comprising limiting the number computing jobs of a signature classification that can be scheduled during a scheduling iteration based on a maximum number of computing job criteria.

7. The method of claim 1, further comprising limiting the number computing jobs of a signature classification that can be scheduled during a scheduling iteration based on a maximum time in the future criteria.

8. The method of claim 1, further comprising selecting a signature classification for scheduling according to service level agreements, policies, constraints, or priorities.

9. The method of claim 8, further comprising selecting a computing job within the selected classification according to service level agreements, policies, constraints, or priorities.

10. The method of claim 8, wherein at least one policy requires that a first certain computing job gets a certain percentage of a resource capacity of the compute farm and a second certain computing job gets another certain percentage of the resources capacity.

11. The method of claim 8, wherein at least one constraint mandates that at least one of no certain computing job and no certain client can consume more than a certain percentage of a resource capacity of the compute farm at any one time.

12. The method of claim 8, wherein at least one priority identifies a first certain computing job or signature classification as being critical to complete prior to a second certain computing job or signature classification.

13. A system for scheduling computing jobs for a compute farm, the system comprising:
   a scheduler comprising a processor and storage,
   wherein the processor causes each computing job provided to the scheduler to be assigned a signature based on at least one computing resource requirement of the computing job,
   wherein the processor causes each computing job to be assigned to a signature classification within the storage corresponding the signature of the computing job,
   wherein the processor assigns a hard to schedule indication to a first signature classification and an easy to schedule indication to a second signature classification, wherein the hard to schedule indication indicates a signature classification with computing jobs with resource requirements that include at least one of rare resources and large amounts of resources;
   wherein the processor selects the first signature classification and determines if a computing job of the first signature classification can be scheduled during a first scheduling iteration,
   wherein if the computing job of the first signature classification cannot be scheduled during the first scheduling iteration, the processor ends scheduling for the first signature classification and selects a second signature classification, determines a minimum number of computing jobs criteria for the second signature classification and schedules at least one computing job of the second signature classification based on the determined minimum number of computing jobs criteria, and
   wherein if the computing job of the first signature classification can be scheduled during the first scheduling iteration, the scheduler schedules the computing job of the first signature classification for processing in the compute farm as a function of the signature classification.

14. The system of claim 13, wherein the storage is a cache.

15. The system of claim 13, wherein the processor characterizes signature classifications as having a high priority or a low priority with respect to performing a scheduling iteration.

16. The system of claim 15, wherein the high priority signature classifications are those containing computing jobs with resource requirements that include rare resources or large amounts of resources.

17. The system of claim 16, wherein a rare resource is a license.

18. The system of claim 16, wherein the processor addresses the high priority signature classifications with respect to scheduling before addressing the low priority signature classifications with respect to scheduling.

19. The system of claim 13, wherein the processor limits the number computing jobs of a signature classification that can be scheduled during a scheduling iteration based on a maximum number of computing job criteria.

20. The system of claim 13, wherein the processor limits the number computing jobs of a signature classification that can be scheduled during a scheduling iteration based on a maximum time in the future criteria.

21. The system of claim 13, wherein the processor selects a signature classification for scheduling according to service lever agreements, policies, constraints, or priorities.

22. The system of claim 21, wherein the processor selects a computing job within the selected classification according to service level agreements, policies, constraints, or priorities.

23. The system of claim 21, wherein at least one of a policy, constraint and priority is a follows:
   a. at least one policy requires that a first certain computing job gets a certain percentage of a resource capacity of the compute farm and a second certain computing job gets another certain percentage of the resources capacity;
   b. at least one constraint mandates that at least one of no certain computing job and no certain client can consume more than a certain percentage of a resource capacity of the compute farm at any one time; and
   c. at least one priority identifies a first certain computing job or signature classification as being critical to complete prior to a second certain computing job or signature classification.

* * * * *